Figure 4:
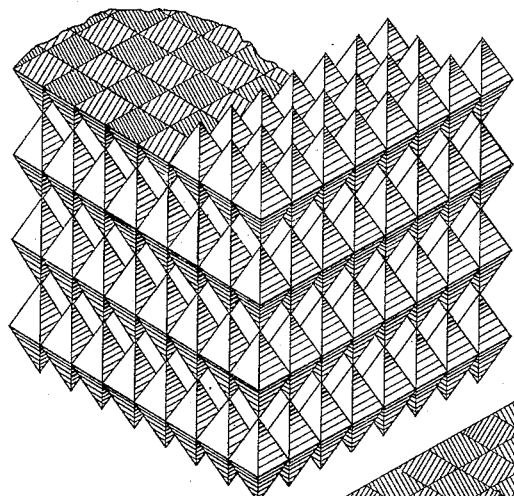

(No Model.) 2 Sheets—Sheet 1.
C. PAYEN.
PROCESS OF PRODUCING CRYSTALLIZED METAL PLATES.
No. 440,575. Patented Nov. 11, 1890.
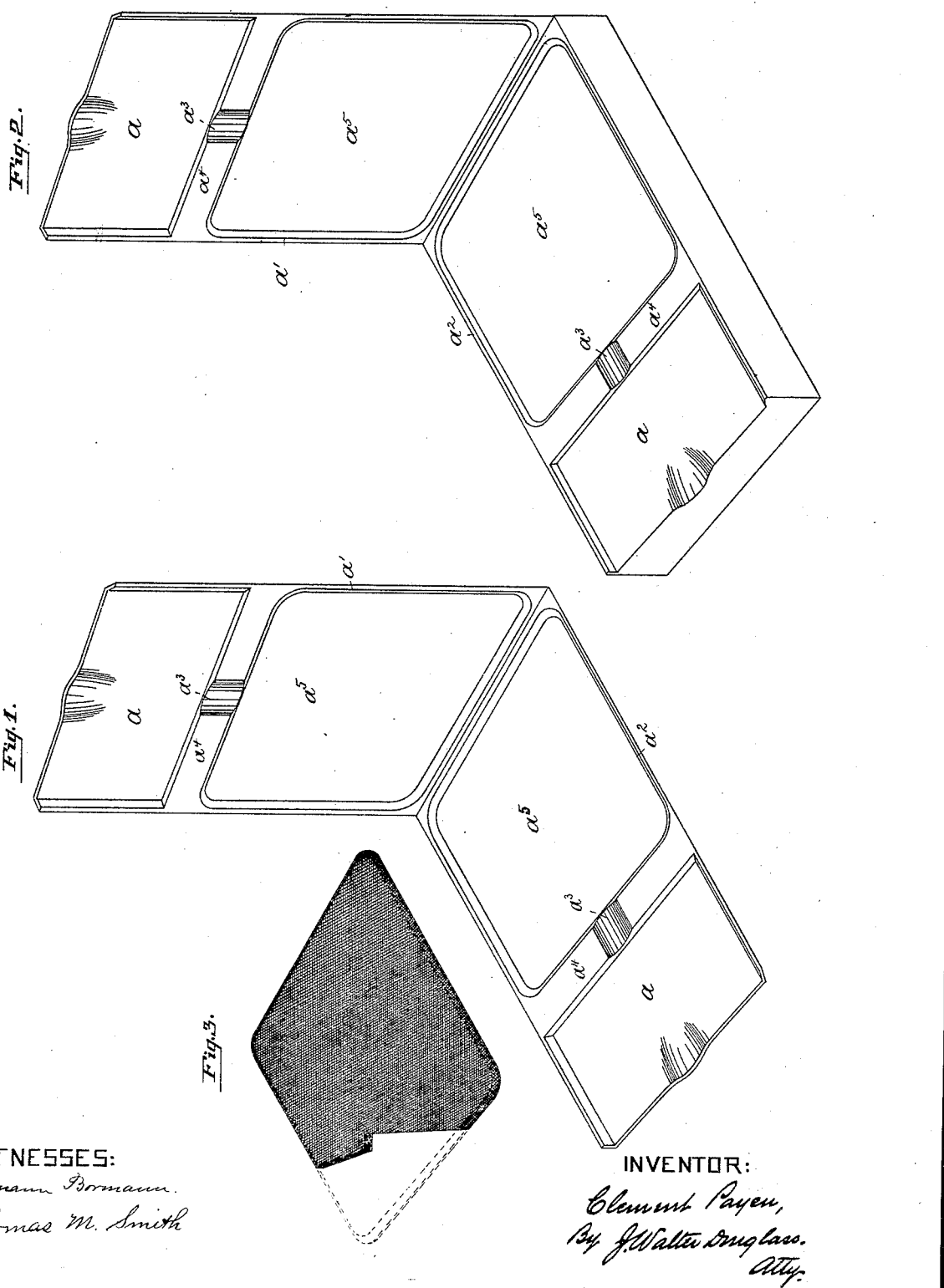
WITNESSES:
Hermann Bormann.
Thomas M. Smith.
INVENTOR:
Clement Payen,
By J. Walter Douglass.
Atty.

(No Model.) 2 Sheets—Sheet 2.

C. PAYEN.
PROCESS OF PRODUCING CRYSTALLIZED METAL PLATES.

No. 440,575. Patented Nov. 11, 1890.

WITNESSES:
Hermann Bormann.
Thomas M. Smith.

INVENTOR:
Clement Payen,
By J. Walter Douglas.
Atty.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF PRODUCING CRYSTALLIZED METAL PLATES.

SPECIFICATION forming part of Letters Patent No. 440,575, dated November 11, 1890.

Application filed May 31, 1888. Serial No. 275,634. (No model.)

*To all whom it may concern:*

Be it known that I, CLÉMENT PAYEN, a citizen of the Republic of France, but now residing at the city of Philadelphia, in the county of Philadelphia and State of Pennsyvlania, have invented certain new and useful Improvements in the Process of Producing Crystallized Metal Plates, of which the following is a specification.

The principal object of my invention is to cause the molecules of the salt or salts of a metal or metals in a mass or compound after fusion and while cooling to meet or unite with each other at their summits, sides or facets to form columns which are caused to meet or unite with each other at or beyond the median line of the mass or compound in solidifying.

My invention consists in melting or fusing a salt or salts of a metal or metals and then discharging the same into a vessel to cause the atomic aggregation or crystals in cooling rapidly or otherwise to meet or unite with each other at their summits, sides, or facets to form parallel or substantially parallel columns from each side of the vessel with the meeting or union of the columns of crystals with each other at or beyond the median line of the structure, thereby producing a strong crystallized plate or other structure for various purposes. The ability to cause the atomic aggregation of a mass or compound after fusion to assume such geometrical regularity in parallel or substantially parallel columns is primarily based upon a principle of the law of physics that the atoms and molecules composing all bodies (whether those bodies consist of a single species of matter or whether they consist of more than one species of matter) are invariably in the form of crystals or groups of crystals, which in the latter instance are similarly disposed in the aggregation comprising said group. At the moment of crystallization of the atoms or molecules these atoms or molecules are always united according to the laws of cohesion or affinity by their summits, sides, or facets.

In the case of a body containing more than one species of matter the molecules or groups of crystals will be united in the same manner.

The important feature of my invention is to cause the metallic atoms to assemble therein and unite with each other with geometrical regularity in the crystallized structure in parallel or substantially parallel columns, whereby the strength of the structure formed is very materially enhanced. If the atoms were not caused to form in the plate or other structure in such manner, in its use as a battery-plate (to which such a plate is especially applicable after treatment to bring it to a porous state) the oxygen or hydrogen when introduced into the plate would by attraction cause a revolution or displacement of the metallic atoms of the plate, so that the atoms of the crystallized structure might present the proper surface or point of juxtaposition for the union of the atoms of oxygen or hydrogen therewith, and the effect of such turning or displacement of the metallic atoms of the crystallized plate would cause its disintegration, and, in time, its total destruction.

In the accompanying drawings is illustrated means for causing a fused mass in cooling to assume a crystallized form, and having the characteristic features hereinbefore mentioned, and in which—

Figure 5:
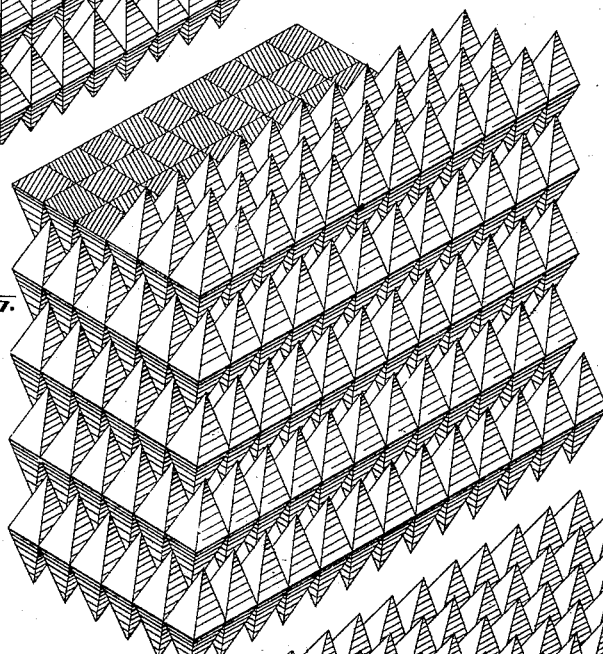
Figure 6:
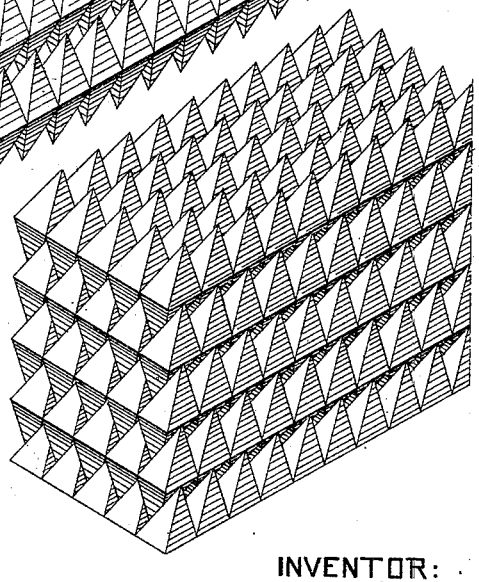

Figure 1 is a perspective view of a two-part mold constructed so that each part thereof will be of equal thickness of metal. Fig. 2 is a similar view of a two-part mold in which the two parts thereof are of unequal thicknesses of metal. Fig. 3 is a perspective view of a crystallized plate made in accordance with my invention, broken away to somewhat illustrate the manner in which the crystals exist therein with geometrical regularity in columns. Figs. 4, 5, and 6 are perspective views showing the manner in which the atoms or crystals of a fused mass in accordance with my invention in cooling meet or unite with each other in the crystallized structure at their summits, sides, or facets, in parallel or substantially parallel columns. These views show also the openings between the crystals, which are formed after the reduction of the structure by electrolytic, chemical, or other actions to a metallic state, when the plates or other structures are to be used as battery plates or electrodes.

In order that my invention may be fully understood, I will now proceed to describe more particularly the characteristic features thereof.

If it is desired to produce a strong porous crystallized metal lead plate, a charge of chloride of lead is taken and to which is added two per cent., by weight, (more or less,) of chloride of zinc or metallic zinc, and two per cent., by weight, (more or less,) of chloride of cadmium, and the mass is melted or fused in a capsule or crucible, and then discharged into the sinking head of a mold consisting of two parts $a'$ and $a^2$, preferably hinged together and passing downward through the opening $a^3$ in a partition-wall $a^4$, between the sinking head $a$ and the matrix $a^5$, having chamfered sides, and in which matrix the mass in cooling assumes a solid crystallized form.

In Fig. 2 a mold similar to that in Fig. 1 is illustrated, with this exception, that one part thereof is of a greater thickness of metal than the other, for a purpose to be fully explained.

The selection of material for the formation of the mold is important, and the interior surface should be perfectly smooth. Molds made of malleable or cast iron become deteriorated in a short time, owing to the tendency of metallic substances or materials to adhere to the sides thereof. The same objection exists respecting the use of porcelain molds, while in the use of molds made of lead, with the exercise of care in handling, good results may be obtained. The material to which preference is given for the formation of the mold is either brass or bronze, the mold being composed of two symmetrical parts $a'$ and $a^2$, as shown, for instance, in Figs. 1 and 2. This metal mold may be constructed of either equal or unequal thicknesses of metal, as desired. When a fused mass is poured into a two-part mold of equal thicknesses of metal, the mass will commence to cool from each side and the crystals composing the same will meet or unite with each other at their summits, sides, or facets, forming columns uniformly throughout the mass, and the columns of crystals thus formed from the respective sides of the mold meet or unite at the median line of the plate or other structure. On the other hand, if the parts of the mold are of unequal thicknesses of metal the crystals of the mass will commence to cool therein from the side having the greater thickness of metal, and will meet the mass forming in columns from the opposite side of the mold beyond the median line of the plate or structure.

In the formation of plates from a fluid mass in molds having the sides of equal thicknesses of metal such plates, when reduced to a metallic state by electrolytic, chemical, or other actions, will be brought to a state or condition with a maximum degree of porosity and strength, thereby rendering them especially applicable for use as electrodes of secondary or other batteries.

In Figs. 4, 5, and 6 are illustrated the three ways in which the crystals united at either their sides, summits, or facets will generally exist in the crystallized plate or other structure made in accordance with my invention.

It will be understood that with the respective crystals united at their summits in the structure a maximum degree of porosity is obtained and a minimum degree of porosity with the union or meeting of the crystals at their facets in the structure.

The plate or structure having been formed in either of the ways hereinabove described, if such is desired for use as a battery plate or electrode, it may be then reduced to a metallic state by electrolytic or chemical action in substantially the following manner:

A series of plates, each composed of chloride of lead as the base with chloride of zinc or metallic zinc and chloride of cadmium having assumed a substantial form with the crystals existing therein with geometrical regularity in parallel or substantially parallel columns, may be placed in a vase containing a solution composed of sulphuric acid and water in the proportion of ten per cent., more or less. The system of crystallized chloride plates immersed in said solution in the vase are alternated with plates of equal dimensions composed of lead, artificial charcoal, or other material, and each provided with a terminal, all the crystallized plates being connected through their terminals with a wire, while the lead, charcoal, or other plates are connected through their terminals with another wire.

The two systems of plates are insulated from each other by means of suitable insulating means and from the vase by means of insulators mounted on rods in the bottom of the vase, the system of crystallized plates or cathodes being connected with the negative electrode of a dynamo, while the system of lead, charcoal, or other plates or anodes are connected with the positive electrode of a dynamo. By the electrolytic action taking place the oxygen and chlorine are separated from the system of crystallized plates and caused to attack the system of lead, charcoal, or other plates, while on the system of crystallized plates there will still remain zinc and cadmium that were combined with the charge, but in a metallic state. The crystallized plates thus treated may then be removed and immersed in another vase containing water and sulphuric acid in about the same proportions as hereinbefore mentioned. In this second vase the crystallized plates are again alternated with plates of lead, charcoal, or other material, as in the previous instance. The two systems of plates insulated from each other and the vase are again connected by two separate wires with the positive and negative electrodes of a dynamo, as in the first instance, with this exception, that the negative electrode is connected with the system of lead, charcoal, or other plates or cathodes through their terminals, while the positive electrode is connected with the system of crystallized plates or anodes through their terminals. By the second electrolytic action which is caused to take place the zinc and cadmium in a metallic state contained in the treated crystallized plates will be deposited on the lead, charcoal, or other plates, while the hydrogen evolved will nearly all escape into the open air. The oxygen will attack the crystallized metal plates.

Another mode of reducing the crystallized plates to a metallic state may be resorted to by chemical action and carried out in the following manner: In a vase containing a solution of a chloride or salt and water, preferably dilute sal-ammoniac in the proportion of five to ten per cent., more or less, a series of crystallized plates is arranged alternately in contact with a series of metallic zinc or other suitable plates of equal dimensions. It is well to select plates for contact with the crystallized plates that have a greater affinity for the foreign elements contained in the crystallized plates than said crystallized plates have for such elements, in order that an economical and quick reduction of the plates may be obtained. In preparing the solution wherein to immerse the plates it is better if such solution should consist in part of a salt belonging to the same family or class as the salt of which the crystallized plates are mainly composed. If a series of crystallized plates arranged in contact with a series of metallic zinc or other plates of equal dimensions be immersed in a solution of sal-ammoniac and water in a vase for from twelve to fifteen hours, more or less, the effect produced by the chemical action taking place upon the crystallized plates will be to eliminate the chlorine or other radical contained in the crystallized plates, and by such elimination to cause the chlorine or other radical to combine with the metallic zinc or other plates, thereby leaving the crystallized plates in a strong porous crystallized metallic state. The porous crystallized plates treated, as described, by electrolytic or chemical action, or both, may then be removed from the vase and thoroughly washed and dried by a gentle heat, whereby the plates will be brought to a chemically-pure porous crystallized metal state.

While I have made mention of certain materials for the production of a crystallized metal plate or other structure, still I do not wish to be understood as limiting myself to the use of those particular materials, as my invention covers, broadly, the art of causing the atomic aggregation or crystals of a mass to be formed with geometrical regularity in parallel or substantially parallel columns in a crystallized metallized plate or other structure.

Having thus described the nature and objects of my invention, what I claim as new, and desire to secure by Letters Patent, is—

1. The art of producing a crystallized plate or other structure, which consists in fusing a salt or salts of a metal or metals and then pouring the mixture or mass into a mold and allowing it to cool, with the crystals of the mixture or mass uniting with each other to form columns or needles, and with these columns or needles of crystals meeting with each other at or beyond the median line of the plate or other structure.

2. The art of producing a crystallized plate or other structure, which consists in fusing a salt or salts of a metal or metals and then pouring the mass or compound into a mold and allowing the same to cool, with the crystals uniting with each other at their summits, sides, or facets to form substantially parallel columns from the sides of the molds and with these columns of crystals meeting with each other at or beyond the median line of the plate or other structure.

In witness whereof I have hereunto set my signature in the presence of two subscribing witnesses.

CLÉMENT PAYEN.

Witnesses:
ANDREW ZANE,
CHAS. HART.